(12) United States Patent
Netzer et al.

(10) Patent No.: US 10,156,299 B2
(45) Date of Patent: Dec. 18, 2018

(54) VACUUM VALVE FOR CONTROLLING A FLOW AND FOR INTERRUPTING A FLOW PATH

(71) Applicant: VAT Holding AG, Haag (CH)

(72) Inventors: Martin Netzer, Bludenz (AT); Daniel Seitz, Au (CH); Harald Sonderegger, Batschuns (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 15/621,831

(22) Filed: Jun. 13, 2017

(65) Prior Publication Data
US 2017/0356569 A1  Dec. 14, 2017

(30) Foreign Application Priority Data

Jun. 14, 2016  (EP) ..................................... 16174376

(51) Int. Cl.
*F16K 51/02* (2006.01)
*F16K 1/24* (2006.01)

(52) U.S. Cl.
CPC ............... *F16K 51/02* (2013.01); *F16K 1/24* (2013.01)

(58) Field of Classification Search
CPC .................................... F16K 1/24; F16K 51/02
(Continued)

(56) References Cited

U.S. PATENT DOCUMENTS 4,480,812 A * 11/1984 Carpentier .............. F16K 15/03
                                                         251/87
5,209,455 A *  5/1993 Uetsuhara ........... F16K 31/0655
                                                         251/87
(Continued)

FOREIGN PATENT DOCUMENTS

DE         2748802 A1    5/1979
DE         4339063 C1    5/1995
DE    102008061315 B4   11/2012

OTHER PUBLICATIONS

EP 16 17 4376, European Search Report, dated Nov. 29, 2016, pp. 1-6.

*Primary Examiner* — Eric Keasel
(74) *Attorney, Agent, or Firm* — Muncy, Geissler, Olds & Lowe, P.C.

(57) ABSTRACT

A vacuum valve, having a valve seat including a valve opening (axis (A)), and a first sealing surface around the valve opening and defines a first sealing plane ($E_S$), having a valve disk with a second sealing surface corresponding to the first sealing surface and defining a second sealing plane ($E_T$), additionally having a first coupling element, connected to the valve disk and comprising a receiving means and a drive unit coupled with the first coupling element and is configured to provide the valve disk adjustable from an open position to a closed position. The drive unit and the valve disk are configured to provide a fine control position, wherein the valve disk is tilted relative to the valve seat where $E_S$ and $E_T$ enclose a defined angle ($\alpha$), and the seal abuts fully against one of the two sealing surfaces and in part against the other sealing surface.

17 Claims, 5 Drawing Sheets

(58) Field of Classification Search
USPC .................................................. 251/84–88
See application file for complete search history.

(56) References Cited

U.S. PATENT DOCUMENTS

| | | | |
|---|---|---|---|
| 6,056,266 A | 5/2000 | Blecha | |
| 6,089,537 A | 7/2000 | Olmsted | |
| 6,416,037 B1 | 7/2002 | Geiser | |
| 6,471,181 B2 | 10/2002 | Duelli | |
| 6,629,682 B2 | 10/2003 | Duelli | |
| 6,913,243 B1 * | 7/2005 | Tomasch | F16K 3/18 251/167 |
| 6,994,311 B2 | 2/2006 | Duelli | |
| 8,678,344 B2 * | 3/2014 | Ehrne | F16K 3/314 251/87 |
| 8,827,241 B2 * | 9/2014 | Geiser | F16K 51/02 251/193 |
| 2008/0066811 A1 | 3/2008 | Duelli | |

\* cited by examiner

VACUUM VALVE FOR CONTROLLING A FLOW AND FOR INTERRUPTING A FLOW PATH

CROSS REFERENCE TO RELATED APPLICATIONS

This application claims priority to European Patent Application No. 16174376.0, which was filed in the European Patent Office on Jun. 14, 2016, and which is herein incorporated by reference in its entirety.

The invention relates to a vacuum control valve having a valve disk and a guide for the valve disk in at least three stages.

In general, different embodiments of vacuum valves are known from the prior art for closing a flow path, which runs through an opening formed in a valve housing, in a substantially gas-tight manner.

Vacuum slider valves are used, in particular, in the area of IC and semiconductor manufacturing, which has to take place in a protected atmosphere, where possible without the presence of contaminating micro-particles. For example, in a production plant for semiconductor wafers or liquid crystal substrates, the highly sensitive semiconductor or liquid crystal elements run sequentially through several process chambers, in which the semiconductor elements, which are located inside the process chamber, are processed by means of, in each case, one processing device. Both during the processing process inside the process chamber and during transport from process chamber to process chamber, the highly sensitive semiconductor elements always have to be situated in a protected atmosphere—in particular in a vacuum.

The process chambers are connected together, for example by means of connecting passages, it being possible to open the process chambers by means of vacuum slider valves for transferring the parts from one to the next process chamber and then to close them to carry out the respective production step in a gas-tight manner. These types of valves are also designated as vacuum transfer valves on account of the described area of application and also as rectangle sliders on account of their rectangular cross sectional opening.

As transfer valves are used, among other things, during production of highly sensitive semiconductor elements, particle generation, which is caused, in particular, by the actuation of the valve and by the mechanical load on the valve closure member, and the number of free particles in the valve space must be kept as small of possible. Particle generation is primarily a consequence of friction, for example produced by metal to metal contact and by abrasion.

Depending on the respective drive technologies, a difference is made, in particular, between slider valves, also called valve sliders or rectangle sliders, and pendulum valves, the closing and opening being effected in the majority of cases in two steps in the prior art. In a first step, a valve closure member, in particular a closure disk, in the event of a slider valve, such as, for example, disclosed in U.S. Pat. No. 6,416,037 (Geiser) or U.S. Pat. No. 6,056,266 (Blecha), in particular of the L-type, is displaced in a linear manner substantially parallel to the valve seat over an opening or in the event of a pendulum valve, such as, for example, disclosed in U.S. Pat. No. 6,089,537 (Olmsted), is pivoted over an opening about a pivot axis without contact taking place, in this connection, between the closure disk and the valve seat of the valve housing. In a second step, the closure disk is pressed by way of the closure side thereof onto the valve seat of the valve housing such that the opening is closed in a gas-tight manner. The sealing can be effected, e.g., either by means of a seal which is arranged on the closure side of the closure disk and is pressed onto the valve seat extending around the opening, or by means of a sealing ring on the valve seat, against which the closure side of the closure disk is pressed. The seal, in particular the sealing ring, can be held in a groove and/or cured-on.

Different sealing devices are disclosed in the prior art, for example in U.S. Pat. No. 6,629,682 B2 (Duelli). A suitable material for sealing rings and seals in vacuum valves is, for example, fluorinated rubber, also called FKM, in particular the fluoroelastomer known by the trade name of "Viton", and perfluorinated rubber, FFKM for short.

The described multi-stage movement where the closure member is firstly slid transversely over the opening without the seal being contacted by the valve seat, and the closure member then being pressed substantially perpendicularly onto the valve seat, provides apart from the advantage of the seal being pressed almost exclusively perpendicularly without the seal being loaded transversely or longitudinally, also the possibility of controlling the flow of a medium (e.g. process gas) through the valve opening.

Either one single drive, which enables an L-shaped movement of the closure member, or a plurality of drives, for example two linear drives or one linear drive and one expansion drive, are used for this purpose.

In a common embodiment of the above-named valve types, the closure member (valve disk) and the valve drive are connected by means of at least one adjustment arm, in particular a push rod or valve rod. In this connection, the rigid adjustment arm is connected to the closure member in a rigid manner by way of one of its ends and to the valve drive in a rigid manner by way of its other end. The closure disk is connected to the at least one push rod by means of screw connection in the case of the majority of valves.

DE 10 2008 061 315 B4 describes a mounting of a valve plate on a valve rod by means of a cross member which extends transversely with respect to the valve rod. The cross member is connected to the valve rod at a central connecting point in particular by means of a screw and is connected to the valve plate at at least two lateral connecting points which are located on both sides of the central connecting point, in particular by means of screw connection. In a central portion which includes the central connecting point and portions connecting on both sides to the same, the cross member is at a spacing from the valve plate. The cross member can preferably be configured in one piece in one material and in particular can be produced entirely of metal.

U.S. Pat. No. 6,471,181 B2 describes a similar mounting. A cross member which is to be connected to the valve rod includes a first plate which comprises a conical opening for receiving the end of the valve rod which is screw-connected to the first plate. Elastic bearing blocks are mounted on the first plate on both sides of the central connecting point to the valve rod, second plates, which are screw-connected in each case to the valve plate, being mounted on the sides of said elastic bearing blocks opposite the first plate.

US 2008/0066811 A1 describes a vacuum valve where a valve plate is connected to first and second cross members. The cross members are connected to the valve plate via connecting members. These comprise connecting arms, which extend from a connecting point to the cross member on both sides in the longitudinal direction of the cross member and are connected at the ends to a common connecting leg, which extends in the longitudinal direction of the cross member and is screw-connected on the valve plate at several points which are at spacings in the longitudinal direction of the cross member. As a result, a more uniform transmission of force is achieved in the longitudinal direction of the cross member.

U.S. Pat. No. 6,994,311 B2 discloses a vacuum control valve with the aim of producing a symmetrical flow through an opening in an open valve position. The valve disk is mounted centrally on a guide (valve rod) and can be guided axially such that a volume flow through the opening can be adjusted in dependence on the spacing between the valve disk and the valve seat.

Common to the above embodiments is that, in particular, during control, a control curve (volume flow per unit time) which results from one of said designs occurs typically with a disadvantageous curve progression. In particular, when transitioning from an almost closed valve state to a completely closed valve state, the curve shows a clearly inhomogeneous curve progression on account of a "snapping shut effect" which occurs in this case. A flow through the opening is abruptly interrupted in this case. As a result, fine adjustment in very low pressure ranges is hardly feasible or rather is not possible.

Consequently, the object underlying the invention is to provide a vacuum valve which provides, on the one hand, controlled gas-tight closure of a valve opening and, on the other hand, improved control functionality for a flow through the opening.

Said object is achieved by the realization of the features of the independent claims. Features which develop the invention further in an alternative or advantageous manner are to be found in the dependent claims.

Underlying the invention is the motivation, in particular in the light of the requirement for precise control of a molecular gas flow within very low vacuum pressure ranges (e.g. less than $10^{-6}$ mbar), to design the flow control in a reliably controlled manner and in a controllable or homogeneous manner over, where possible, the entire control curve. Molecular gas flows also play a role in the transit zone ($<10^{-3}$ mbar) and are characterized by relatively large free path lengths of the gas molecules. The invention is based on the approach of implementing control of the flow by means of an initially angled contact between the valve disk and the valve seat, the volume flow being adjustable in dependence on the relative tilt position (with contact between valve disk and valve seat). A larger opening angle means, in this connection, a larger size of opening and consequently the possibility of a flow of greater volume per unit time. By reducing the opening angle, the flow can be reduced in steps and/or continuously until there is complete contact between the sealing surfaces or rather between the seal of the valve seat and of the valve disk and the opening is consequently in a completely closed state (closed position).

Using a valve according to the invention, above-named flows can be controlled in an advantageous manner, i.e. even in the case of very low pressures and at the same time providing and maintaining a substantially symmetrical and laminar flow.

The invention relates to a vacuum valve, in particular to a vacuum control valve, for controlling a volume flow or mass flow and for interrupting a flow path in a gas-tight manner. The valve has a valve seat which comprises a valve opening, which defines an opening axis, and a first sealing surface which extends around the valve opening and defines a first sealing plane. In addition, a valve disk for controlling the volume flow or mass flow and for interrupting the flow path is provided with a second sealing surface which corresponds to the first sealing surface, wherein the second sealing surface defines a second sealing plane, the modifiable position of which is determined by a respective position and alignment of the valve disk.

In addition, the valve has a first coupling element, which is connected to the valve disk and comprises a receiving means for providing controlled guidance of the valve disk, and a drive unit, which is coupled with the first coupling element, in particular by means of the receiving means, and is configured in such a manner that the valve disk is adjustable. The valve disk is adjustable from an open position, in which the valve disk and the valve seat are present in a contactless manner relative to one another, into a closed position, in which there is axially sealing contact between the first sealing surface and the second sealing surface as a result of a seal which lies between them and the valve opening is closed in a gas-tight manner as a result, and back, at least substantially along a geometric longitudinal axis in a longitudinal closing direction or a longitudinal opening direction.

The drive unit and the valve disk are configured in such a manner and interact in such a manner, in particular they are coupled in such a manner that the valve disk is adjustable into a fine control position, wherein the valve disk is tilted in a defined manner relative to the valve seat in such a manner that the first sealing plane and the second sealing plane enclose a defined angle, and the seal abuts fully against one of the two sealing surfaces and only abuts in part against the other sealing surface. In other words, the first and the second sealing surfaces are only partially in contact by means of the seal. The first or the second sealing surface is therefore only pressed partially onto the seal. Another part of the seal remains untouched by the oppositely situated sealing surface. As a result, a consciously non-entire sealing of the opening is produced.

In the fine control position, consequently, a smaller surface portion of the seal is in contact with or is pressed by the oppositely situated sealing surface than in the closed position.

As a result of such a targeted tilt position and of the opening range of the valve opening which is adjustable in dependence on the tilt, advantageous pressure and flow control is made possible. Such control can be used typically, e.g., when process gas is used and there is the resultant requirement for adjusting a required pressure. As a result of a permanent laminar flow of the medium through the opening, which can be brought about in this way, pressure fluctuations can be avoided and the required pressure can be reached in a faster manner. As a result of the additionally provided possibility for complete separation between the valve disk and the valve seat (open position), the flow opening can otherwise be chosen to be very large.

The drive unit and the valve disk are configured and coupled in particular in such a manner that when the valve disk is adjusted from the open position into the closed position or from the closed position into the open position, the valve disk assumes the fine control position prior to reaching the closed position or rather prior to reaching the open position. This can be configured, for example, by corresponding actuation of the drive unit, e.g. as a result of controlled tilting of the guide rod or of the disk relative to the valve seat. The tilting can be provided, for example, in a guiding of the guide rod, i.e. as a result of a correspondingly pivotable bearing arrangement of the guide. Tilting just the disk relative to the seat can also be provided as a result of a correspondingly variable bearing arrangement of the disk relative to the guide rod or relative to an adjustment arm.

As an alternative to this, the disk can already be arranged at a pre-determined transverse position with reference to the sealing surface of the valve seat. The desired tilt position can also be achieved in this way.

In addition, a different linear movement (closing movement) can be carried out with reference to two end sides of the valve disk (not top and bottom surfaces but with reference to the disk edge) such that the one side of the disk reaches the seat earlier than the oppositely situated side.

According to an embodiment according to the invention, the valve disk is positioned in the fine control position in such a manner that the second sealing plane, which is defined by an extension of the second sealing surface, tilts to the opening axis or to the longitudinal axis. The position of the longitudinal axis is defined, in particular, by the direction of adjustment provided by the drive unit. The valve disk would then not be moved, e.g., in a direction parallel to a normal of the disk bottom surface, but would be moved in its tilt position transversely with respect thereto, in particular such that it then contacts the valve seat in said tilt position.

With reference to the alignment of the sealing surface of the valve seat, according to a realization, the first sealing surface (of the valve seat) can point in a direction parallel to the opening axis or to the longitudinal axis and extend orthogonally to the opening axis or to the longitudinal axis. Such a configuration is the typical realization of a valve according to the invention.

As an alternative to this, the first sealing surface, however, can also point in a direction transversely to the opening axis or longitudinal axis and at an angle to a plane which extends orthogonally to the opening axis or to the longitudinal axis. In such a realization which is also according to the invention, even in the case of an orthogonal alignment relative to the longitudinal axis or opening axis, the valve disk can be moved at an angle to bear on the valve seat and the control can be provided by the tilt position. In other words, in place of a targeted transverse position of the valve disk, the valve seat or rather the sealing surface thereof can be angled.

In an embodiment, the first and the second sealing planes enclose a defined angle $\alpha$ in the open position and in the fine control position and the first and the second sealing planes are aligned substantially parallel to one another in the closed position. When there is movement from the fine control position toward the closed position, the value of the angle $\alpha$ therefore moves closer and closer to "zero" and is finally at "zero".

It is obvious that according to an embodiment it is not only one single fine control position that can be adjusted, but a second, several or a plurality of fine control positions of the valve disk are adjustable, in particular continuously. In this case, the angles $\alpha_n$, which are enclosed in each case by the first and the second sealing planes, are different in each case and the first and the second sealing surfaces are only partially in contact in each case by means of the seal. The several fine control positions can therefore correspond in each case to another tilt position of the valve disk with reference to the valve seat. In particular, each tilt position can be assigned to a respective fine control position during a continuous closing movement.

In particular, the fine control positions can be adjusted in a controlled manner in each case individually or successively and consequently, in particular continuous control of the volume flow or mass flow of a medium through the valve opening can be provided. The flow can be maintained, in this case, in particular in a laminar manner. Such control is provided in particular by a stepping motor or a servomotor of the drive unit, by means of which the guide rod or rather push rod is moved.

With regard to the coupling of the valve disk with the drive unit or rather with reference to the elastic pivotability, within a certain framework, as a result of the mounting of the valve disk, the first coupling element can be configured according to an embodiment as a cross member which extends transversely with respect to the opening axis or to the longitudinal axis and is connected to the valve disk at at least one connecting point on a rear side of the valve disk.

Such a cross member is configured elastically with regard to material used and/or form, i.e. this provides a certain torqueability and consequently pivoting of the disk about a pivot axis which is defined by the extension of the member. Said characteristic of the cross member enables homogeneous pressing of the sealing surface onto the seal (or rather vice versa) beyond the possible fine control positions up to complete closure of the valve. A form of moving the valve disk (closed) can be effected by twisting the cross member without any transverse load occurring on the sealing material and consequently without any unwanted particle generation. Moving is effected then from a tilt position into a parallel position of the sealing planes.

In one realization, the receiving means of the cross member provides a central coupling point for coupling the drive unit transversely with respect to a direction of extension of the cross member and the cross member is connected to the drive unit by means of an adjustment arm which extends transversely with respect to the direction of extension of the cross member. The cross member is therefore connected, in this connection, to the adjustment arm and the valve disk is guided by a movement of the adjustment arm.

According to a further embodiment, the cross member can be connected to the valve disk in a corresponding manner on the rear side of the valve disk at at least two lateral connecting points which are located on both sides of the central coupling point. In a central portion, which includes the central coupling point and portions which connect on both sides to said coupling point and extends between the lateral connecting points, the cross member can then be at a certain spacing from the rear side and can be configured resiliently in such a manner that as a result of twisting the cross member, the valve disk is pivotable relative to the adjustment arm about a pivot axis which is at right angles to the opening axis or to the longitudinal axis. The cross member and the adjustment arm are configured, in particular, in one piece.

In particular, the connection between the cross member and the valve disk at the at least one connecting point can comprise a friction stir welding connection. As a result, the risk of particle generation, which is provided, e.g., in the case of screw-connection, is further reduced.

According to an embodiment according to the invention, the drive unit comprises at least one motor and at least one guide component, in particular guide rod, which is movable by means of the at least one motor in a controlled manner along or parallel to the longitudinal axis and the valve disk is connected to the guide component by means of the receiving means and is movable relative to the valve seat. For example, the disk is indirectly connected to the guide component by means of an adjustment arm and a cross member. The position of the longitudinal axis is in particular defined by the extension of the guide component which, e.g., is configured or rather is designated as a push rod or guide rod, and/or by the direction of linear movement which is provided by the drive unit.

According to a specific embodiment, the drive unit comprises at least one motor, in particular two motors, and two guide components, in particular guide rods, which are movable by means of the at least one motor or rather the two motors in a controlled manner parallel to the longitudinal axis. The two guide components define, in this case, a common longitudinal axis which forms, e.g., a center parallel to the two guide rods.

In particular, the valve disk can comprise a second coupling element which is connected to it and has a receiving means, wherein the first and the second coupling elements are directly arranged on the valve disk, in particular are configured in one piece with the valve disk, and in each case a guide component is connected to a respective one of the receiving means of the first and of the second coupling element. The coupling elements are, in particular, situated opposite one another, i.e. they can be mounted or formed in an axially symmetrical manner on the edge of the disk with reference to a center perpendicular through the valve disk. Consequently, an alignment of the disk relative to the valve seat can be modified by means of an individual movement of the two guide rods. If the one rod, e.g., is moved further than the other one, the disk can be aligned at an angle to the seat and can be guided into the fine control position.

According to one embodiment, the drive unit can therefore comprise two motors and each of the two guide components can be movable in a controlled manner by one of the motors. The fine control position, in particular the plurality of fine control positions, is or rather are providable by means of a defined, in particular individual, actuation of the two motors in such a manner that the tilt position of the first sealing plane relative to the second sealing plane can be brought about as a result.

In one realization, the valve comprises a bridge which connects the two guide components, wherein the first coupling element is connected to the bridge. With such an embodiment, the valve disk can be arranged centrally between the guide rods. The desired tilt position of the disk can be configured by means of corresponding motor actuation, i.e. the first disk end, which is coupled with the first guide rod, is guided such that the spacing between the same and the valve seat is smaller than the spacing between the same and the second disk end. The coupling element can be configured, in this connection, in particular, as the cross member. As a result, highly precise control of the flow through the valve opening can be effected from the combination between the elasticity of the cross member and the individual motor actuation, homogeneous pressing of the seal and an extensively laminar flow through the opening being provided.

The above embodiment consequently combines the two-part disk guide (with two guide rods) with a cross member, by means of which the valve disk is coupled at least in an indirect manner with the guide rods.

The device according to the invention is described in more detail below in a purely exemplary manner by way of specific exemplary embodiments which are shown schematically in the drawings, further advantages of the invention also being looked at. The figures are as follows.

Figure 1A:
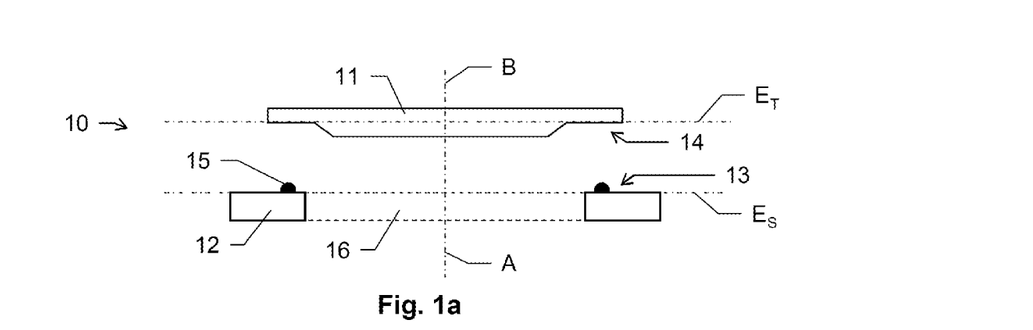
FIGS. 1a-b show a first and a second embodiment of a vacuum valve according to the invention in an open position.

FIG. 1a shows a schematic view of a cross section through an embodiment of a vacuum valve 10 according to the invention in an open position. The valve 10 comprises a valve disk 11 as a closure element and a valve seat 12 which is situated opposite the valve disk 11. The valve seat 12 extends around and consequently defines a valve opening 16. The valve disk 11 is arranged so as to be movable relative to the valve seat 12, the mobility being provided at least along an opening axis A, which is defined by the opening 16, or along an axis B, which is defined by the alignment of the second sealing surface 14. The axes A and B coincide in the position shown on account of a parallel alignment of the disk 11 or rather of the sealing surface 14 thereof relative to the seat 12.

As an alternative to this, the valve disk 11 can also be aligned in the open position not parallel but at at an angle (tilt) relative to the valve seat 12.

Both the valve disk 11 and the valve seat 12 have in each case a sealing surface—a first sealing surface 13 and a second sealing surface 14. The first sealing surface 13 additionally comprises a seal 15. Said seal 15 can be cured onto the valve seat 12 for example as a polymer by means of vulcanization. As an alternative to this, the seal 15 can be configured, for example, as an O-ring seal in a groove of the valve seat 12. A sealing material can also be bonded onto the valve seat 12 and as a result embody the seal 15. In an alternative embodiment, the seal 15 can be arranged on the side of the valve disk 11, in particular on the second sealing surface 14. Combinations of said realizations are also conceivable.

The sealing surface 13 defines a first sealing plane $E_S$ for the valve seat 12 and the sealing surface 14 defines a second sealing plane $E_T$ for the valve disk 11. The position of the sealing planes $E_T$ and $E_S$ is consequently firstly dependent on the extension of the respective sealing surface and secondly on the current spatial alignment (and position) of the valve disk 11 or rather of the valve seat 12.

Figure 1B:
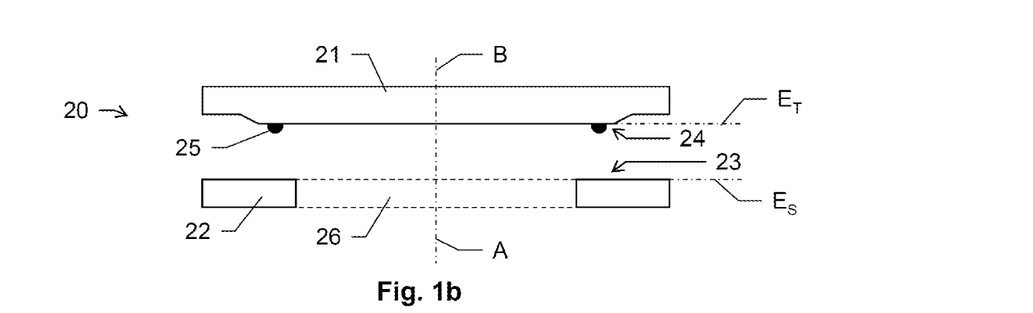

FIG. 1b shows a further embodiment of a valve 20 according to the invention in an open position. The valve 20 is designed in a similar manner to that from FIG. 1a.

In contrast, the seal 25 here is arranged on the side of the sealing surface 24 of the valve disk 21 and a corresponding sealing surface 23 is configured on the valve seat 22. The sealing surfaces 23 and 24 define, in turn, corresponding sealing planes $E_T$ and $E_S$.

FIGS. 1a and 1b show respective valve realizations in a purely schematic manner. A drive unit for moving the valve disk 11 or rather 21 relative to the respective valve seat is not shown in either case. Such a drive unit typically comprises a motor, in particular a stepping motor or a servomotor. The valve disk can be coupled to the drive unit by means of a corresponding structure. Different realizations are possible for this according to the invention.

Firstly, the drive unit can comprise a push rod (guide rod) which is movable in a linear manner along a longitudinal axis by means of the motor. A first end of an adjustment arm is connected to the push rod, in particular angled transversely or orthogonally with respect to the rod. The connection between push rod and adjustment arm is configured in a rigid manner. A cross member, which extends transversely with respect to the adjustment arm and is connected, in turn, to the valve disk, is provided on a second, oppositely situated end. The cross member is configured resiliently in such a manner that the disk is pivotable about a pivot axis which is defined by the extension of the cross member. A desired pivotability of the disk and consequently the possibility of a desired tilt position and modification of the tilt of the disk relative to the valve seat are made possible, in this connection, as a result of the member being twisted.

A device with two guide components (push rods) can be configured as an alternative or also combinable design of the output for the valve disk. The disk has, in this connection, two receiving means which are arranged, in particular, on two oppositely situated sides with reference to the disk circumference. Each one of the receiving means has connected thereto one push rod. The drive of the push rods is effected in a preferred manner by means of two motors, but can also be implemented with at least one motor and one gearing unit. A tilt position and adjustment of the tilt position of the valve disk relative to the valve seat can also be provided in a controlled manner as a result of a linear movement of the push rods (with reference to the linear position of the push rods) which is not effected in parallel.

Figure 2A:
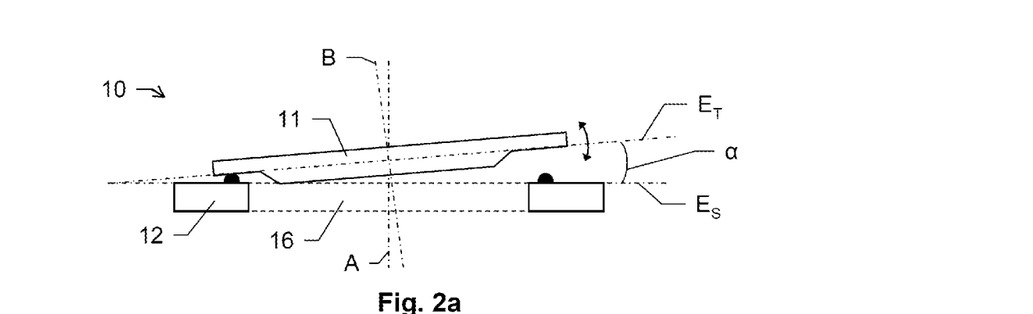
FIGS. 2a-b show the first and the second embodiments of a vacuum valve according to the invention in an fine control position.
Figure 2B:
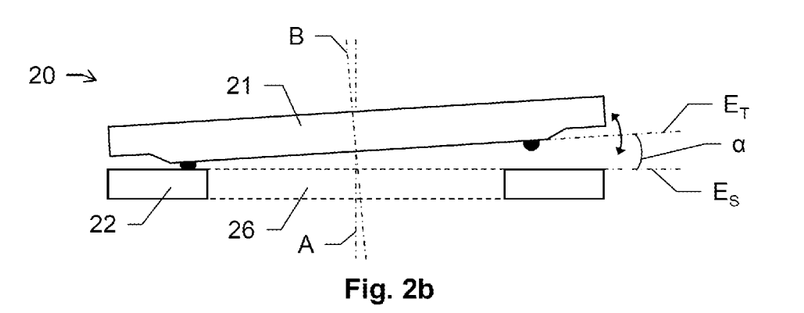

FIGS. 2a and 2b show the valve realizations according to FIGS. 1a and 1b not in the open position, but in a fine control position. In this connection, in each case the valve disks 11 or rather 21 are not aligned parallel to the valve seats 12 or rather 22, but are at a tilt relative to one another. The valves are configured (and where applicable controlled) such that such a fine control position can be reached and assumed in each case with a closing movement of the valve disk prior to reaching a closed position.

The sealing planes $E_T$ and $E_S$ are not present in parallel in this case and consequently intersect one another, an angle α being enclosed. Said desired tilt position, that is to say the opening angle α, can be varied by retaining at least partial contact with the seal 15 or rather 25 (here the left-hand side of the circumferential seal). Advantageous flow control is provided as a result. The smaller the angle α is adjusted to be, the smaller the possible flow rate per unit time of a medium. An advantage, in this case, is in particular that the angle α still remains adjustable in steps or continuously even in the case of relatively very small angles and a force, resulting from a pressure difference at the two valve disk sides (top and bottom), also varies continuously at the disk. As a result, a very precise closing or opening movement can be carried out, a continuously applied or interrupted flow of a medium being able to be controlled in particular when transitioning toward or from the closed position or into the control position.

In particular, when the angle is modified, the surface of the contacted seal also varies. As the angle becomes increasingly smaller, the contact surface of the sealing material becomes greater.

The control is advantageous in particular when a smaller pressure prevails at the bottom of the disk (in the direction of the valve seat) than at the top. As a result of the partial contacting between the valve disk and the valve seat (by means of the seal), part of the force acting on the disk (on account of the pressure difference) can already be absorbed by means of the contact surface and thus does not have to be absorbed by the valve drive or the disk mounting.

In the fine control position, the valve disk 11 or rather 21 can also be seen as a flap which, when contacting the valve seat 12 or rather 22, is turned or pivoted about an axis.

Different mechanical solutions are conceivable for providing the angled abutment of the valve disk 11 and 12 against the respective valve seats 12 and 22. As in vacuum technology in general and for vacuum valve solutions in particular, sealing solutions with an avoidance of or a clearly reduced risk of particle generation are to be preferred. To this end, an avoidance of a relative mobility of components, or, where such mobility is necessary, a bearing arrangement of components where possible without the occurrence of friction between the components is to be preferred.

Particle-avoiding driving and retaining solutions for the disk are consequently proposed according to the invention as in FIGS. 4 and 5 below. The linear mobility of the valve disk relative to the respective valve seat is, in this case, beyond doubt and has to be provided, however the aspect of the pivotability of the disk about a pivot axis for adjusting the tilt relative to the seat in the fine control position is, in this case, also to be considered and is achieved here according to the invention (avoidance of particle generation).

Figure 3A:
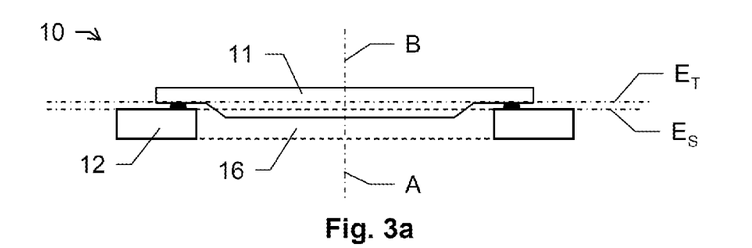
FIGS. 3a-b show the first and the second embodiments of a vacuum valve according to the invention in a closed position.
Figure 3B:
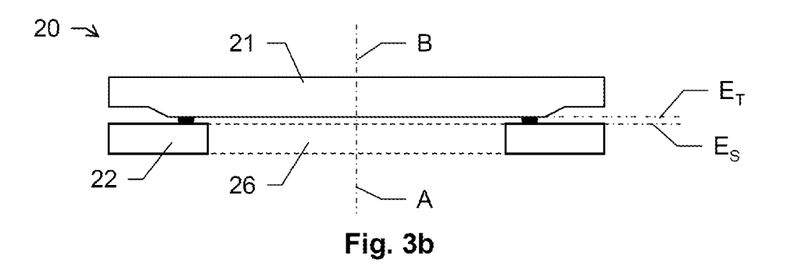

FIGS. 3a and 3b show the valves 10 and 20 in each case in a sealed closed position in which a flow of a medium through the valve opening 16 or 26 is completely interrupted on account of the sealing action which is provided fully by the seal 15 or rather 25. Each seal 15 or 25 is, in this case, in full contact with the oppositely situated corresponding sealing surface of the opposite side, i.e. over the entire circumference about the valve opening, and presses to a pre-determined degree. The sealing planes $E_T$ and $E_S$ are present in parallel.

Figure 4A:
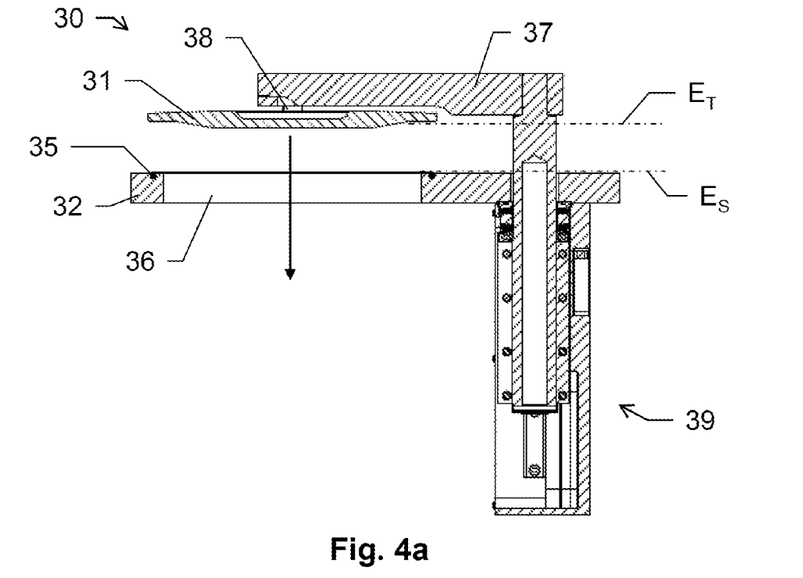
FIGS. 4a-c show various perspectives of a third embodiment of a vacuum valve according to the invention in an open position and in a fine control position.
Figure 4B:
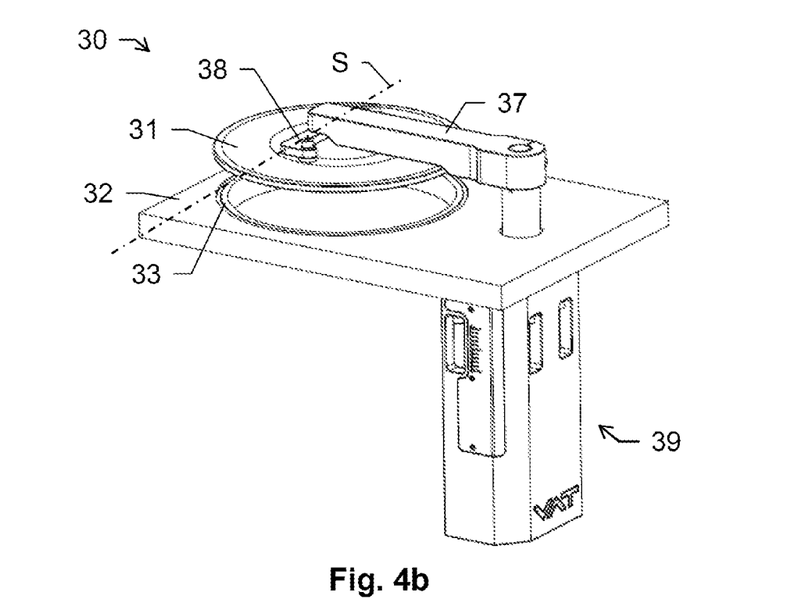

FIGS. 4a and 4b show an embodiment according to the invention of a vacuum valve 30 in an open position. The valve disk 31 is positioned in a parallel manner at a spacing from the valve seat 32 and exposes the valve opening 36.

A seal 35 is mounted on the sealing surface 33 of the valve seat 32. The progression of the sealing surface 33 defines a sealing plane $E_S$.

The valve disk 31 is connected to an adjustment arm 37 by means of a coupling element which is configured as a cross member 38. The progression of the sealing surface of the valve disk 31, which is located opposite the sealing surface 33 of the valve seat 32 and corresponds with the same as regards form and size, defines the sealing plane $E_T$. In the open position, the sealing planes $E_T$ and $E_S$ are aligned parallel to one another.

The cross member 38 defines, by means of the extension thereof transversely with respect to the adjustment arm 37, a pivot axis S which also extends transversely with respect to the adjustment arm 37. The cross member 38 is connected fixedly (here: screw-connected) to the adjustment arm 37 in the center region of said cross member and fixedly to the valve disk 31 at the ends of said cross member. However, the respective fastenings can also be produced in an alternative manner, e.g. by means of bolts or a weld (e.g. friction stir weld). In particular, the adjustment arm 37 and the cross member 38 can be configured in one piece.

The cross member 38, itself, is formed in such a manner that it provides a certain material elasticity and, as a result, is twistable about the pivot axis S within a pre-defined range (e.g. with reference to an angle of twist and force absorption) in a substantially wear-free manner.

The adjustment arm 37 is connected to the drive unit 39 by means of a push rod or guide rod. The disk 31 can be moved in a linear manner along the extension of the push rod by means of the drive 39.

Figure 4C:
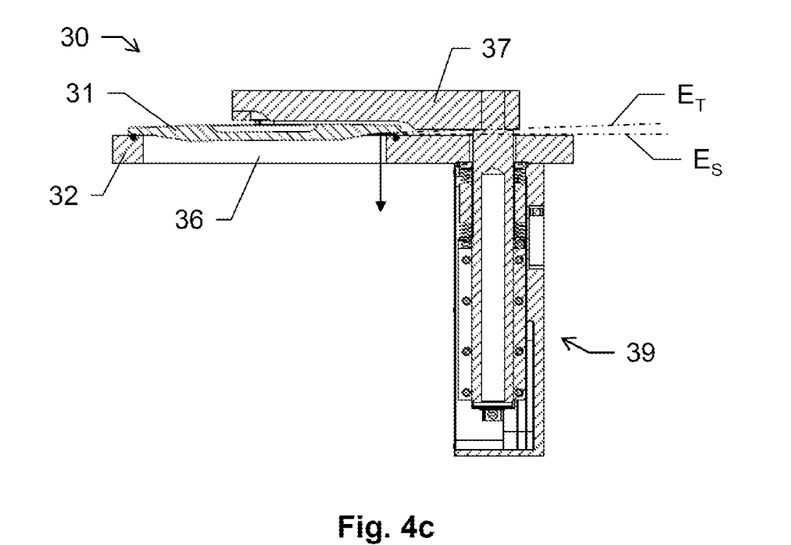

FIG. 4c shows the valve 30 in a fine control position. The valve disk 31 is partially in contact with the seal 35. On the shown right-hand side of the cross section through the disk 31, there is no contact between the disk 31 and the seal 35. The valve disk 31 is therefore not aligned parallel to the valve seat 32. The sealing planes $E_T$ and $E_S$ intersect at a defined angle α.

The shown fine control position can be produced as a result of the connection between the cross member 38 and the adjustment arm 37 being configured so as to be pivotable (in a controlled manner). When the valve disk 31 moves closer to the valve seat 32, a slight pivoting can be set up and maintained (fixed). As an alternative to this, the disk 31 can be fastened by means of the cross member 38 in such a manner that the disk 31 is not parallel to the valve seat 32 in the open position, but already comprises a relative tilt position. The sealing planes $E_T$ and $E_S$, in this case, are correspondingly not parallel, but enclose a certain angle α.

The disk 31, as a result of the linear approaching movement, then abuts in a correspondingly tilted manner against the seat 32. As a result of further linear adjustment by means of the drive 39, the tilt of the disk 31 can be modified by twisting the cross member 38. If the push rod is therefore retracted further, the opening angle α becomes smaller. In this case, the cross member 38 is acted upon by way of an inner torsion, i.e. is twisted. As a result, a continuously modifiable and, in this case, homogeneously maintained pressing of the disk sealing surface on the seal 35 can be provided. This can result in the complete closure of the opening 36 such that, here too, with regard to the seal progression, the seal is pressed in a homogeneous manner.

The cross member consequently enables continuous (or stepwise) modification of the tilt position as a result of being twisted, the seal 35 being pressed in a homogenous manner. Particle generation is additionally minimized or completely prevented as a result of the seal being pressed in a homogeneous manner and as a result of consequently no transverse load being effected on the seal.

As an alternative to the tilt position at the connection between the adjustment arm 37 and the cross member 38, the tilt position of the disk 31 relative to the seat 32 can also be provided by means of pivoting or by means of a permanent tilt position of the push rod. The effect provided then by the cross member corresponds to the aforenamed variant.

Figure 5A:
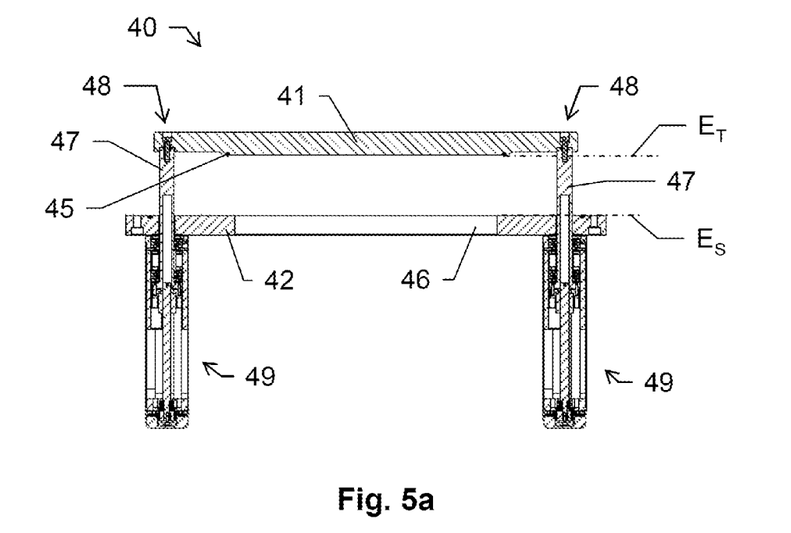
FIGS. 5a-c show various perspectives of a fourth embodiment of a vacuum valve according to the invention in an open position and in a fine control position.
Figure 5B:
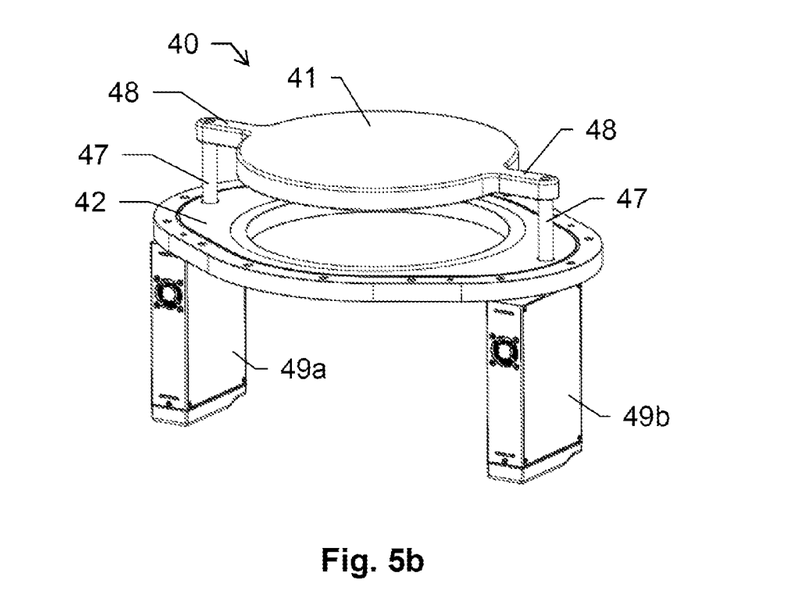

FIGS. 5a and 5b show a further embodiment according to the invention of a vacuum valve 40 in an open position. The valve disk 41 is positioned in a parallel manner at a spacing to the valve seat 42 and exposes the valve opening 46.

In contrast to a realization according to FIGS. 4a-c, the valve disk 41 is arranged so as to be movable relative to the valve seat 42 by means of two guide rods 47 which can each be moved in a controlled manner by way of a motor of a drive unit 49. The seal 45 is situated on the bottom surface of the disk 41. The respective sealing surfaces define, in turn, the sealing planes $E_T$ and $E_S$.

The guide rods 47 are connected to the receiving means of two coupling elements 48. The coupling elements 48 are configured here in one piece with the valve disk 41, however, it is obvious that the coupling elements 48 can also be designed as separate components, said coupling elements being able to be screw-connected or welded, e.g., to the disk 41.

Figure 5C:
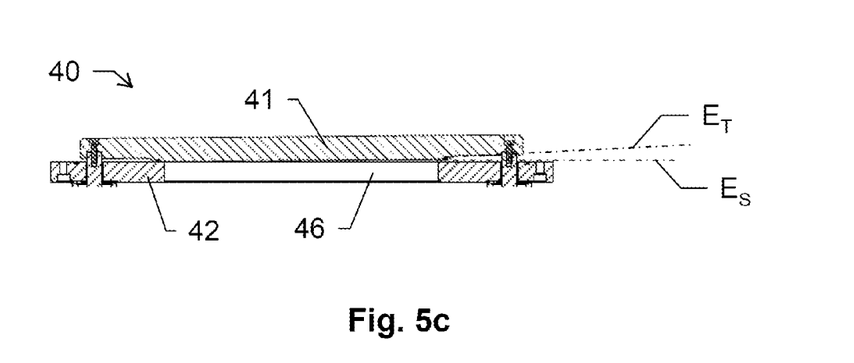

For adjusting a certain fine control position as shown in FIG. 5c, the two driving parts 49a and 49b of the drive 49 can be actuated correspondingly in an individual manner. One of the two driving parts 49a, 49b, in this case, generates a distance travelled for one of the guide rods 47 which is greater than the distance provided by the second drive for the other guide rod 47 within the same time period. In other words, one of the guide rods 47 is retracted quicker than the other at least over a certain time period. As an alternative to this, the linear movement produced by way of the first drive can be started earlier than that produced by way of the second drive, the drives providing a substantially synchronous movement as a result.

A valve disk 41 which is tilted relative to the valve seat 42 is produced as a result. The valve disk 41 or rather the seal 45 thereof is contacted (in part) by the valve seat 42 with said tilt position which is adjustable in this manner (FIG. 5c). Once a first end position has been reached with the first guide rod 47, which is guided faster or rather further, the control of a flow or rather of a stream through the valve opening 46 can be provided just by displacing the second guide rod 47 further in a linear manner. The first end position can correspond substantially to the position of the disk 41 where there is contact between the seal 45 and the valve seat. It is obvious, however, that once contact has been made a further linear displacement can be effected in order to achieve a desired pressing of the sealing material 45. The first and also a second end position can therefore also correspond with a generating of a desired seal compression.

It is obvious that the figures shown only show possible exemplary embodiments in a schematic manner. According to the invention, the different approaches can also be combined with one another and with methods and devices for controlling a volume flow or pressure in a process volume under vacuum conditions of the prior art.

The invention claimed is:

1. A vacuum control valve for controlling a volume flow or mass flow and for interrupting a flow path in a gas-tight manner, having
   a valve seat which comprises a valve opening, which defines an opening axis (A), and a first sealing surface which runs around the valve opening and defines a first sealing plane ($E_S$),
   a valve disk for controlling the volume flow or mass flow and for interrupting the flow path, having a second sealing surface which corresponds to the first sealing surface, wherein the second sealing surface defines a second sealing plane ($E_T$), a modifiable position of which is determined by a respective position and alignment of the valve disk,
   a first coupling element, which is connected to the valve disk and comprises a receiving means, for providing controlled guidance of the valve disk and
   a drive unit which is coupled with the first coupling element and is configured in such a manner that the valve disk is adjustable from
     an open position, in which the valve disk and the valve seat are present in a contactless manner relative to one another, into
     a closed position, in which there is axially sealing contact between the first sealing surface and the second sealing surface as a result of a seal which lies between them, and in which the valve opening is closed in a gas-tight manner as a result,
   and that the valve disk is adjustable back from the closed position to the open position, along a geometric longitudinal axis in a longitudinal closing direction,
wherein
the drive unit and the valve disk are configured and interact in such a manner that the valve disk is adjustable into a fine control position, wherein
   the valve disk is tilted in a defined manner relative to the valve seat in such a manner that the first sealing plane ($E_S$) and the second sealing plane ($E_T$) enclose a defined angle (α), and the seal abuts fully against the first or second sealing surface and abuts only in part against the respectively other sealing surface.

2. The vacuum control valve according to claim 1, wherein the drive unit and the valve disk are configured and coupled in such a manner that when adjusting the valve disk from the open position into the closed position or from the closed position into the open position, the valve disk assumes the fine control position prior to reaching the closed position or rather prior to reaching the open position.

3. The vacuum control valve according to claim 1, wherein the valve disk is positioned in the fine control position in such a manner that the second sealing plane ($E_T$), which is defined by an extension of the second sealing surface, tilts to the opening axis (A) or to the longitudinal axis.

4. The vacuum control valve according to claim 1, wherein
the first sealing surface points in a direction parallel to the opening axis (A) or longitudinal axis and extends orthogonally to the opening axis (A) or longitudinal axis, or
the first sealing surface points in a direction transversely to the opening axis (A) or longitudinal axis and tilted to a plane which extends orthogonally to the opening axis (A) or longitudinal axis.

5. The vacuum control valve according to claim 1, wherein
the first and second sealing planes ($E_S$, $E_T$) enclose the defined angle ($\alpha$) in the open position and in the fine control position, and
the first and second sealing planes ($E_S$, $E_T$) are aligned substantially parallel in the closed position.

6. The vacuum control valve according to claim 1, wherein a second, several or a plurality of fine control positions of the valve disk are adjustable wherein
an angle ($\alpha_n$), which is enclosed in each case by the first and second sealing planes ($E_S$, $E_T$), is different in each case, and
the seal abuts fully in each case against one of the two sealing surfaces and abuts only in part against the other sealing surface.

7. The vacuum control valve according to claim 6, wherein the second, several or the plurality of fine control positions of the valve disk are successively adjustable.

8. The vacuum control valve according to claim 6, wherein the plurality of fine control positions are adjustable in a controlled manner in each case individually or continuously and consequently a control of the volume flow or mass flow of a medium through the valve opening is providable.

9. The vacuum control valve according to claim 8, wherein the control of the volume flow or mass flow of the medium through the valve opening is providable in a continuous manner.

10. The vacuum control valve according to claim 1, wherein the first coupling element is configured as a cross member which extends transversely with respect to the opening axis (A) or to the longitudinal axis and is connected to the valve disk at at least one connecting point on a rear side of the valve disk, wherein the receiving means provides a central coupling point for coupling the drive unit transversely with respect to a direction of extension of the cross member, and the cross member is connected to the drive unit by means of an adjustment arm which extends transversely with respect to the direction of extension.

11. The vacuum control valve according to claim 10, wherein the connection between the cross member and the valve disk comprises a friction stir welding connection at the at least one connecting point.

12. The vacuum control valve according to claim 10, wherein the cross member
is connected to the valve disk on the rear side of the valve disk at least two lateral connecting points which are located on both sides of the central coupling point,
is at a spacing from the rear side, in a central portion, which includes the central coupling point and portions which connect on both sides to the coupling point and extends between the at least two lateral connecting points, and
is configured resiliently in such a manner that as a result of distortion of the cross member, the valve disk is pivotable relative to the adjustment arm about a pivot axis (S) which is at right angles to the opening axis (A) or to the longitudinal axis.

13. The vacuum control valve according to claim 1, wherein
the drive unit comprises at least one motor and at least one guide component, which is movable by means of the at least one motor in a controlled manner along or parallel to the longitudinal axis, and
the valve disk is connected to the at least one guide component by means of the receiving means and is movable relative to the valve seat.

14. The vacuum control valve according to claim 13, wherein the drive unit comprises two guide components, which are movable by means of the at least one motor in a controlled manner parallel to the longitudinal axis.

15. The vacuum control valve according to claim 14, wherein
the valve disk comprises a second coupling element which is connected to it and has a receiving means, wherein the first and second coupling elements are arranged directly on the valve disk, and
in each case a guide component is connected to a respective one of the receiving means of the first and second coupling elements.

16. The vacuum control valve according to claim 14, wherein
the drive unit comprises two motors and each of the two guide components is movable in a controlled manner by one of the two motors, and
the fine control position is providable by means of a defined actuation of the two motors in such a manner that the tilt position of the first sealing plane ($E_S$) relative to the second sealing plane ($E_T$) can be brought about as a result.

17. The vacuum control valve according to claim 14, wherein
the vacuum valve comprises a bridge which connects the two guide components, and
the first coupling element is connected to the bridge.

* * * * *